US012665980B2

(12) United States Patent
Berkhahn

(10) Patent No.: US 12,665,980 B2
(45) Date of Patent: Jun. 23, 2026

(54) MULTIPLEXER, VIDEO SYSTEM, AIRCRAFT AND METHOD FOR OUTPUTTING VIDEO DATA

(71) Applicant: Airbus Operations GmbH, Hamburg (DE)

(72) Inventor: Sven-Olaf Berkhahn, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 24 days.

(21) Appl. No.: 18/586,660

(22) Filed: Feb. 26, 2024

(65) Prior Publication Data

US 2024/0291935 A1 Aug. 29, 2024

(30) Foreign Application Priority Data

Feb. 28, 2023 (EP) ...................................... 23158972

(51) Int. Cl.
*H04N 5/268* (2006.01)

(52) U.S. Cl.
CPC .................................... *H04N 5/268* (2013.01)

(58) Field of Classification Search
CPC ...................................................... H04N 5/268
See application file for complete search history.

(56) References Cited

U.S. PATENT DOCUMENTS

| | | | |
|---|---|---|---|
| 7,030,934 B2 | 4/2006 | Shy et al. | |
| 8,356,319 B2 * | 1/2013 | Fernandez | G09G 5/00 |
| | | | 345/581 |

| | | | |
|---|---|---|---|
| 10,669,027 B2 | 6/2020 | Riedel et al. | |
| 2006/0277589 A1 | 12/2006 | Margis et al. | |
| 2007/0090972 A1* | 4/2007 | Monroe | H04N 5/76 |
| | | | 340/945 |
| 2007/0124042 A1* | 5/2007 | Monroe | G08B 13/19663 |
| | | | 701/3 |
| 2007/0195111 A1 | 8/2007 | Yao et al. | |
| 2013/0076540 A1* | 3/2013 | McLoughlin | G08G 5/21 |
| | | | 340/945 |
| 2015/0015551 A1* | 1/2015 | Honda | G09G 3/2096 |
| | | | 345/204 |
| 2017/0364471 A1* | 12/2017 | Chen | G06F 13/1673 |
| 2018/0295311 A1* | 10/2018 | Wang | H04N 1/00095 |

FOREIGN PATENT DOCUMENTS

DE 102009045462 A1 4/2011

OTHER PUBLICATIONS

European Search Report for corresponding European Patent Application No. 23158972 dated Aug. 2, 2023.

* cited by examiner

*Primary Examiner* — Randy A Flynn
(74) *Attorney, Agent, or Firm* — Greer, Burns & Crain, Ltd.

(57) ABSTRACT

A multiplexer having a first video data input to receive first video data; a second video data input to receive second video data; a video data output to output the first video data and the second video data; and a switching device arranged between the first and second video data inputs and the video data output and designed so that all of the first video data are output by the video data output. Also a video system, an aircraft and a method for outputting video data.

13 Claims, 3 Drawing Sheets

MULTIPLEXER, VIDEO SYSTEM, AIRCRAFT AND METHOD FOR OUTPUTTING VIDEO DATA

CROSS-REFERENCES TO RELATED APPLICATIONS

This application claims the benefit of European Patent Application Number EP 23 158 972.2 filed on Feb. 28, 2023, the entire disclosure of which is incorporated herein by way of reference.

FIELD OF THE INVENTION

The present invention relates to a multiplexer, a video system, an aircraft and a method for outputting video data.

BACKGROUND OF THE INVENTION

The passengers in modern passenger aircraft are provided with a large amount of visual information. This includes firstly essential information, for instance advice of the obligation to put on a safety belt during a takeoff or landing operation, and non-essential information, for instance entertainment media.

Due to the desire for all components of an aircraft to be configured as compactly as possible, there are also efforts to configure the display apparatuses for the different types of information as compactly as possible too, as described for instance in the document DE 10 2009 045 462 A1. Displaying all video data by means of a single display apparatus has already been considered, but has not been able to be realized to date because it has not been possible to ensure that the essential information is guaranteed to be displayed.

Apparatuses for combining multiple video data inputs to produce a single video data output are known in other fields, for instance from the document U.S. Pat. No. 7,030,934 B2. Since these do not involve a distinction being drawn between essential and non-essential video data, however, they cannot readily be used in an aircraft.

SUMMARY OF THE INVENTION

In this context, the present invention is based on an object of allowing multiple video data sources to be combined in a single video display in the context of the demands on the operation of an aircraft.

This object may be achieved by a multiplexer having the features of one or more embodiments described herein, a video system having the features of one or more embodiments described herein, an aircraft having the features of one or more embodiments described herein, and a method for outputting video data having the features of one or more embodiments described herein.

Accordingly, there is provision for a multiplexer having a first video data input, which is designed to receive first video data, a second video data input, which is designed to receive second video data, a video data output, which is designed to output the first video data and the second video data, and a switching device, which is arranged between the first and second video data inputs and the video data output and designed to ensure that all of the first video data are output by the video data output.

According to another aspect of the invention, there is provision for a video system having at least one multiplexer according to the invention, a first video data generation apparatus, which is connected to the first video data input of the at least one multiplexer, a second video data generation apparatus, which is connected to the second video data input of the at least one multiplexer, and at least one video display apparatus, which is connected to the video data output of the at least one multiplexer.

According to another aspect of the invention, there is provision for an aircraft having a video system according to the invention.

According to another aspect of the invention, there is provision for a method for outputting video data, comprising receiving first video data by way of a first video data input of a multiplexer, receiving second video data by way of a second video data input of the multiplexer, and outputting video data by way of a video data output of the multiplexer, the second video data being output only if a switching device of the multiplexer determines that all of the first video data have been output.

One concept of the present invention is the provision of a switching device that is intended in a standard state to forward the first video data to the video data output and to forward the second video data only in cases in which all of the first video data have been forwarded, not all of the second video data necessarily being forwarded to the video data output. This results in the video data being prioritized, with the first video data being assigned a higher priority than the second video data. If, for example in the context of an aircraft, the first video data should be essential and the second video data should be non-essential, this ensures that essential data are guaranteed to be displayed.

According to one exemplary embodiment, the multiplexer is designed in such a way that all of the first video data are transferred to the switching device. As a result, it is advantageously possible to prevent portions of the first video data from not being output.

According to another exemplary embodiment, the multiplexer furthermore comprises a video evaluation device, which is designed to analyze the first video data and to determine a first pixel of a video frame contained in the first video data. As a result, it is advantageously possible to easily determine the times at which first video data are supposed to be output.

According to another exemplary embodiment, the multiplexer furthermore comprises a first pixel counting device, which is designed to take the first pixel, determined by the video evaluation device, as a basis for causing the switching device to output the second video data when all pixels of the video frame contained in the first video data have been output. As a result, it is advantageously possible to easily determine the times at which first video data are supposed to be output.

According to another exemplary embodiment, the multiplexer furthermore comprises a second pixel counting device, which is designed to take the first pixel, determined by the video evaluation device, as a basis for causing the second video data to be transferred to the switching device when all pixels of the video frame contained in the first video data have been output. As a result, it is advantageously possible to easily prevent second video data from being output instead of first video data.

According to another exemplary embodiment, the multiplexer furthermore comprises a storage device, which is designed to store the second video data. As a result, it is advantageously possible to ensure that the second video data are available when they are supposed to be output.

According to one exemplary embodiment of the video system, the first video data generation apparatus is designed to generate essential, in particular safety-related, video data and the second video data generation apparatus is designed to generate non-essential, in particular non-safety-related, video data. This exemplary embodiment ensures that the essential video data are guaranteed to be displayed.

According to another exemplary embodiment, the video system comprises a multiplicity of multiplexers and a multiplicity of video display apparatuses. The first video data generation device is connected to each first video data input of each of the multiplicity of multiplexers, the second video data generation device is connected to each second video data input of each of the multiplicity of multiplexers, and each of the multiplicity of video display apparatuses is connected to the video data output of one of the multiplicity of multiplexers. As a result, the video data, in particular the first video data, can be displayed on multiple display apparatuses simultaneously.

According to one exemplary embodiment, the method furthermore comprises determining a first pixel of a video frame contained in the first video data by way of a video data evaluation device of the multiplexer. As a result, it is advantageously possible to easily determine the times at which first video data are supposed to be output.

According to another exemplary embodiment of the method, the switching device of the multiplexer uses a first pixel counting device, which assigns the first video data to individual video frames on the basis of the determined first pixel of the video frame contained in the first video data, to determine when all of the first video data have been output. As a result, it is advantageously possible to easily determine the times at which first video data are supposed to be output.

According to another exemplary embodiment of the method, the second video data are transferred only to the switching device when a second pixel counting device of the multiplexer takes the determined first pixel of the video frame contained in the first video data as a basis for determining that all of the first video data have been output. As a result, it is advantageously possible to easily prevent second video data from being output instead of first video data.

According to another exemplary embodiment of the method, the second video data are stored in a storage device of the multiplexer. As a result, it is advantageously possible to ensure that the second video data are available when they are supposed to be output.

BRIEF DESCRIPTION OF THE DRAWINGS

The invention is explained below with reference to the figures of the drawings. Of the figures.

In the figures, the same reference signs denote identical or functionally identical components unless indicated to the contrary.

DETAILED DESCRIPTION OF THE PREFERRED EMBODIMENTS

Figure 1:
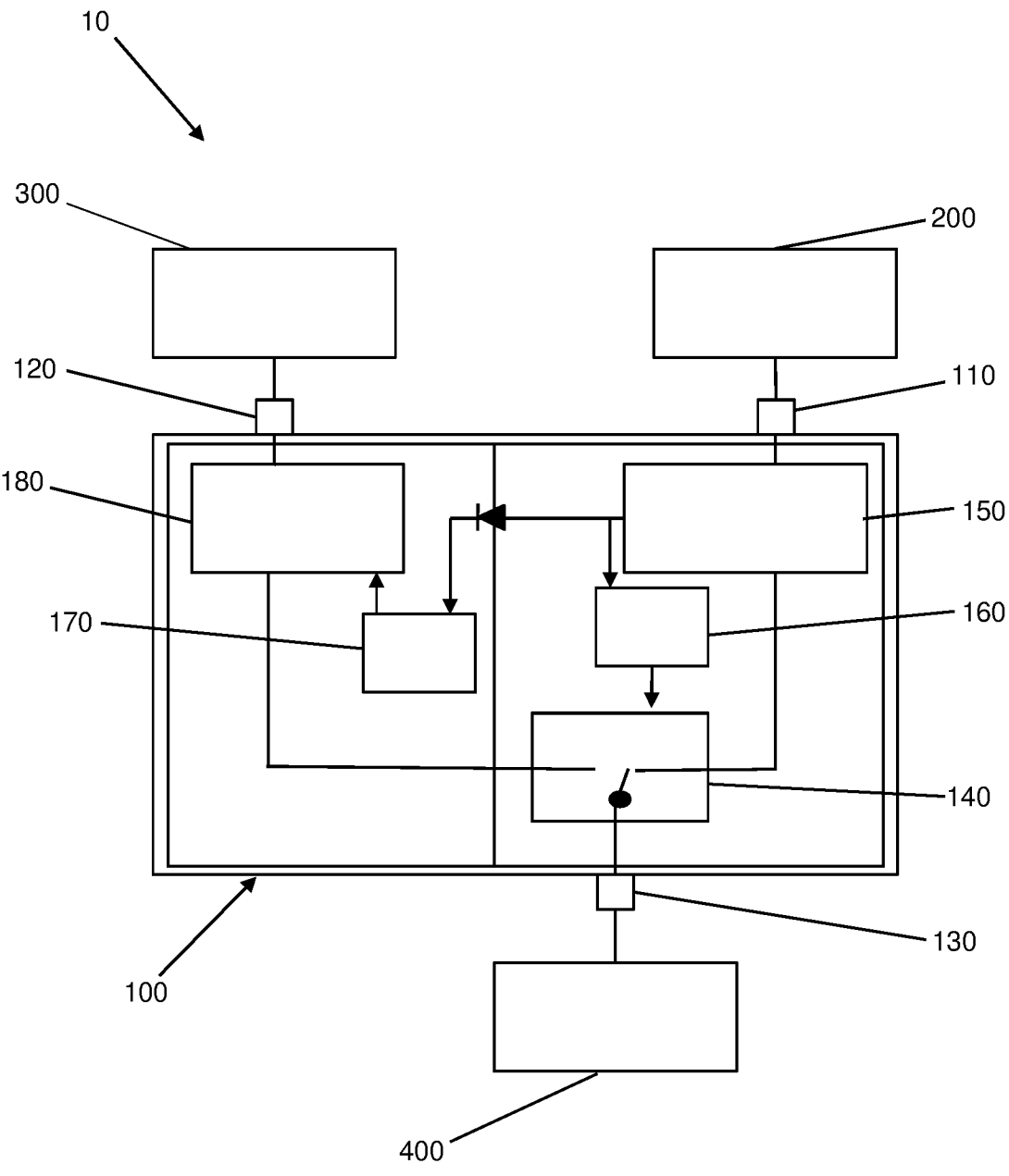
FIG. 1 shows a schematic representation of a video system according to an exemplary embodiment of the present invention.

FIG. 1 shows a schematic representation of a video system 10 according to an exemplary embodiment of the present invention.

The video system 10 comprises a multiplexer 100, a first video data generation apparatus 200, a second video data generation apparatus 300 and a video display apparatus 400.

The multiplexer 100 comprises a first video data input 110, a second video data input 120, a video data output 130, a switching device 140, a video evaluation device 150, a first pixel counting device 160, a second pixel counting device 170 and a storage device 180.

The first video data input 110 is connected to the first video data generation apparatus 200 and designed to receive first video data from the first video data generation apparatus 200. The second video data input 120 is connected to the second video data generation apparatus 300 and designed to receive second video data from the second video data generation apparatus 300. The video data output 130 is connected to the video display apparatus 400 and designed to output video data, in the present exemplary embodiment either the first video data or the second video data, to the video display apparatus 400. Depending on which of the first or second video data are output at what time, a different reproduced video image is obtained on the video display apparatus 400 because the individual pixels of the image are based on either the first or the second video data.

The switching device 140 is arranged between the first 110 and second 120 video data inputs and the video data output 130 and designed to ensure that all of the first video data are output by the video data output 130, which simultaneously ensures that all of the first video data are represented in the video displayed by the video display apparatus 400. This process is explained in more detail below for the exemplary embodiment shown here.

The multiplexer 100 is designed in such a way that all of the first video data are transferred to the switching device 140. The switching device 140 can therefore forward all of the first video data to the video data output 130. The video evaluation device 150 is designed to analyze first video data and to determine a first pixel of a video frame contained in the first video data. If this first pixel is known, the known number of pixels in each video frame of the first video data and the transmission rate of the first video data from the first video data generation apparatus 200 to the first video data input 110 can be used, by simply counting the pixels, to determine the time at which first video data need to be output via the video data output 130.

There is therefore provision for the first pixel counting device 160, which is designed to take the first pixel, determined by the video evaluation device 150, as a basis for causing the switching device 140 to output the second video data when all pixels of the video frame contained in the first video data have been output. As described above, counting the pixels of the first video data makes it possible to determine the time at which the first video data need to be output. At all other times, the switching device 140 can then forward the second video data to the video data output 130. The combined result is then an image on the video display apparatus 400 in which all of the first video data are displayed while at the same time the remainder of a screen of the video display apparatus 400 displays the second video data.

Additionally, there is provision in the present exemplary embodiment for the second pixel counting device 170, which is designed to take the first pixel, determined by the video evaluation device 150, as a basis for causing the second video data to be transferred to the switching device 140 when all pixels of the video frame contained in the first video data have been output. Since second video data are transferred only to the switching device 140, it is possible to prevent second video data from inadvertently being output when first video data are actually supposed to be output.

Additionally, there is provision in the present exemplary embodiment for the storage device 180, which is designed to store the second video data. As a result, second video data are prevented from being no longer available when they are supposed to be forwarded.

Figure 2:
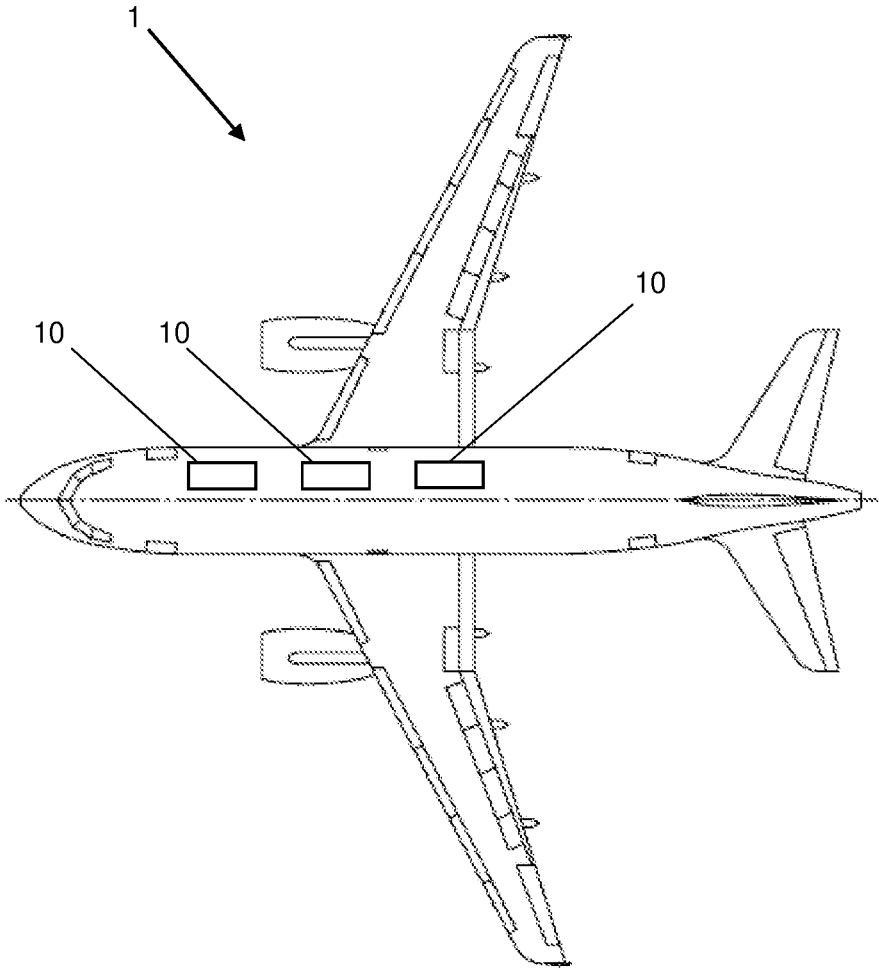
FIG. 2 shows a schematic representation of an aircraft according to an exemplary embodiment of the present invention.

FIG. 2 shows a schematic representation of an aircraft 1 according to an exemplary embodiment of the present invention.

The aircraft 1 comprises a multiplicity of video systems 10, three of which in total are shown in FIG. 2. The video systems 10 in the present exemplary embodiment are arranged in the region of the cabin for the passengers. In general, there is provision for a number of video systems 10 that can be used to ensure that there is provision for a video display apparatus for each passenger, multiple passengers also being able to share a video display apparatus, depending on the configuration of the video display apparatuses.

The video systems 10 may be designed as shown in FIG. 1. In this case, there would be provision for dedicated first and second video data generation apparatuses for each video system 10. However, there may also be provision for one or more of the video systems 10 to comprise a multiplicity of multiplexers, the respective first video data generation device being connected to each first video data input of each of the respective multiplicity of multiplexers, and the respective second video data generation device being connected to each second video data input of each of the respective multiplicity of multiplexers. In this case, the applicable video systems would comprise a multiplicity of video display apparatuses, each of the respective multiplicity of video display apparatuses being connected to the video data output of one of the respective multiplicity of multiplexers. In such a case, it would even be conceivable for an aircraft 1 to comprise just a single video system 10, in which case the individual video display apparatuses of the multiplicity of video display apparatuses are distributed in the aircraft as appropriate.

In an aircraft 1 of the present exemplary embodiment, the respective first video data generation apparatuses may be designed to generate essential, in particular safety-related, video data and the respective second video data generation apparatuses may be designed to generate non-essential, in particular non-safety-related, video data. Essential video data in this case may include all data necessary for the passenger, for example during a takeoff or landing operation or during an emergency, for instance regarding an obligation to put on a safety belt. Non-essential video data may include for instance entertainment media or the like.

Figure 3:
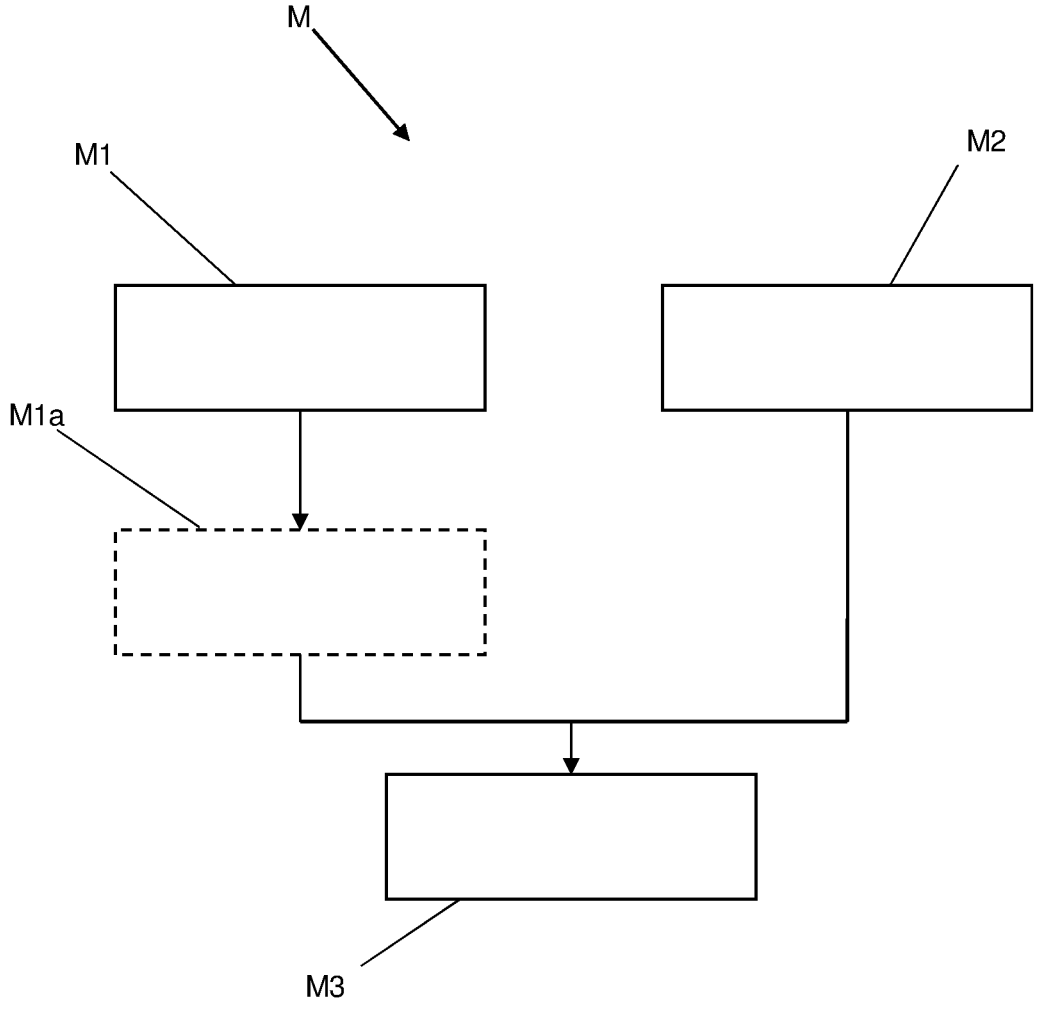
FIG. 3 shows a schematic flowchart for a method for outputting video data according to an exemplary embodiment of the present invention.

FIG. 3 shows a schematic flowchart for a method M for outputting video data according to an exemplary embodiment of the present invention.

In a first method step M1, first video data are received by way of a first video data input of a multiplexer. In a second method step M2, which can generally take place at the same time as the first method step M1, second video data are received by way of a second video data input of the multiplexer. In a further method step M3, video data are output by way of a video data output of the multiplexer, the second video data being output only if a switching device of the multiplexer determines that all of the first video data have been output.

In an optional method step M1a, a first pixel of a video frame contained in the first video data can be determined by way of a video evaluation device of the multiplexer.

The method shown here can be carried out in particular as described above with reference to the exemplary embodiment of a video system shown in FIG. 1.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be appar- ent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft
10 video system
100 multiplexer
110 first video data input
120 second video data input
130 video data output
140 switching device
150 video evaluation device
160 first pixel counting device
170 second pixel counting device
180 storage device
200 first video data generation apparatus
300 second video data generation apparatus
400 video display apparatus
M method for outputting video data
M1 method step for receiving first video data
M1a method step for determining a first pixel
M2 method step for receiving second video data
M3 method step for outputting video data

The invention claimed is:
1. A multiplexer comprising:
a first video data input configured to receive first video data, the first video data including a predetermined number of pixels representing all pixels of the first video data;
a second video data input configured to receive second video data;
a video data output configured to output the first video data and the second video data;
a switching device arranged between the first and second video data inputs and the video data output and configured to switch between providing the first video data to the video data output and providing the second video data to the video data output;
a video evaluation device configured to analyze the first video data and to determine a first pixel of a video frame contained in the first video data; and
a first pixel counting device configured to assign the first video data to a plurality of video frames based on the predetermined number of pixels and to take the first pixel, determined by the video evaluation device, and determine a number of pixels output of the first video data;
wherein, when the number of pixels output of the first video data reaches the predetermined number of pixels, the switching device is configured so that all of the first video data are output by the video data output; and
wherein, when the number of pixels output of the first video data is below the predetermined number of pixels, the switching device is configured so that all of the second video data are output by the video data output.
2. The multiplexer according to claim 1, wherein the multiplexer is further configured so that all of the first video data are transferred to the switching device.
3. The multiplexer according to claim 1, wherein the first pixel counting device is configured to take the first pixel, determined by the video evaluation device, as a basis for causing the switching device to output the second video data when all pixels of the video frame contained in the first video data have been output.
4. The multiplexer according to claim 1, further comprising:
a second pixel counting device configured to take the first pixel, determined by the video evaluation device, as a basis for causing the second video data to be transferred to the switching device when all pixels of the video frame contained in the first video data have been output.
5. The multiplexer according to claim 1, further comprising:
a storage device configured to store the second video data.
6. A video system comprising:
at least one multiplexer, the at least one multiplexer according to claim 1;
a first video data generation apparatus connected to the first video data input of the at least one multiplexer;
a second video data generation apparatus connected to the second video data input of the at least one multiplexer; and
at least one video display apparatus connected to the video data output of the at least one multiplexer.
7. The video system according to claim 6, wherein the first video data generation apparatus is designed to generate essential video data, and the second video data generation apparatus is designed to generate non-essential video data.
8. The video system according to claim 6, further comprising:
a plurality of multiplexers, the first video data generation device connected to each first video data input of each of the multiplexers from the plurality of multiplexers, and the second video data generation connected to each second video data input of each of the multiplexers from the plurality of multiplexers; and
a plurality of video display apparatuses, each of the video display apparatus from the plurality of video display apparatuses connected to the video data output of one of the multiplexers from the plurality of multiplexers.
9. An aircraft comprising:
a video system according to claim 6.
10. A method for outputting video data, the method comprising:
receiving first video data by way of a first video data input of a multiplexer, the first video data including a predetermined number of pixels representing all pixels of the first video data;
receiving second video data by way of a second video data input of the multiplexer;
determining a first pixel of a video frame contained in the first video data by way of a video evaluation device of the multiplexer;

assigning the first video data to a plurality of video frames based on the predetermined number of pixels;

counting a number of pixels output of the first video data by way of a first pixel counting device of the multiplexer; and outputting video data by way of a video data output of the multiplexer, the first video data being output when the number of pixels output of the first video data reaches the predetermined number of pixels and the second video data being output only when the number of pixels output of the first video data is below the predetermined number of pixels, indicative that all of the first video data have been output.

11. The method according to claim 10, further comprising a switching device of the multiplexer configured to utilize the first pixel counting device to determine when all of the first video data have been output.

12. The method according to claim 10, wherein the second video data are transferred only to a switching device when a second pixel counting device of the multiplexer takes the determined first pixel of the video frame contained in the first video data as a basis for determining that all of the first video data have been output.

13. The method according to claim 10, wherein the second video data are stored in a storage device of the multiplexer.

* * * * *